Oct. 9, 1956 V. L. SMITHERS 2,765,585
FLORAL SUPPORT
Filed May 12, 1953
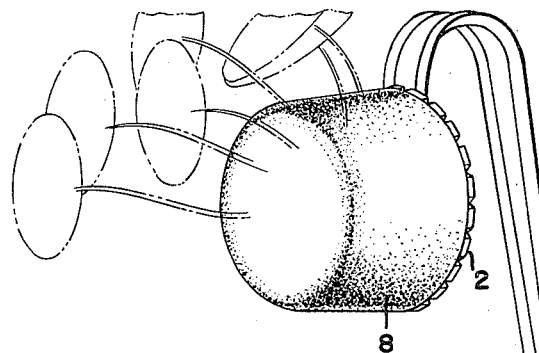
FIG. 1
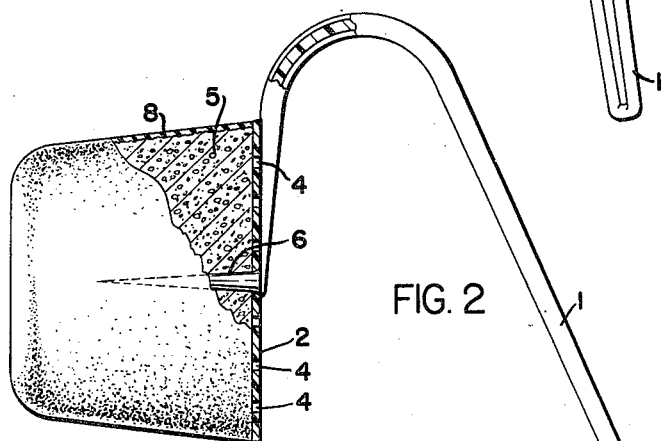
FIG. 2
FIG. 4
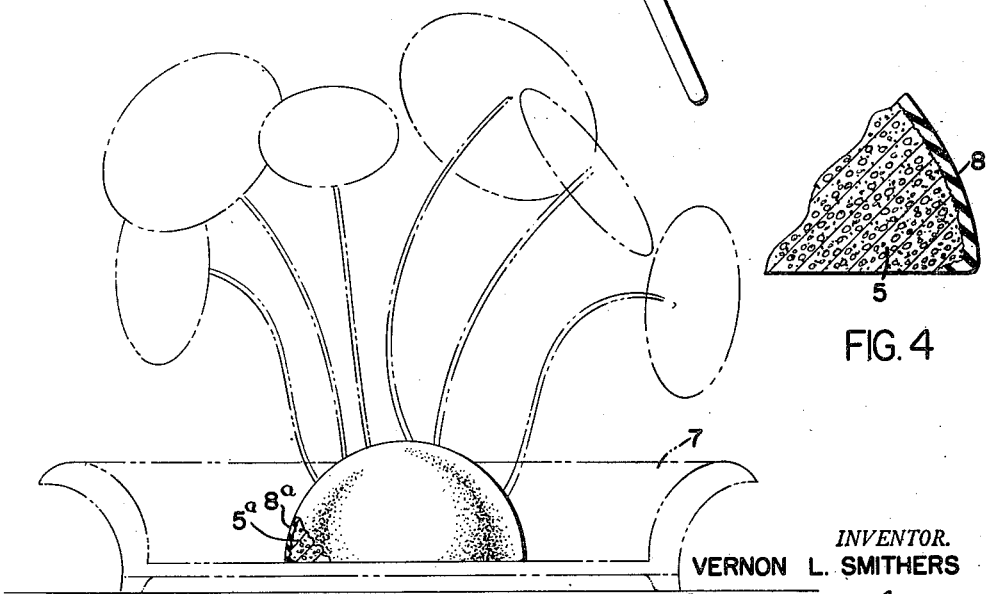
FIG. 3
INVENTOR.
VERNON L. SMITHERS
BY
ATTYS.

United States Patent Office 2,765,585
Patented Oct. 9, 1956

2,765,585

FLORAL SUPPORT

Vernon L. Smithers, Akron, Ohio

Application May 12, 1953, Serial No. 354,464

5 Claims. (Cl. 47—41)

The present invention relates to a new and improved form of floral support, the body of which is composed of a water absorbent foam made of any of the well known synthetic resins suitable for the purpose. The object of the invention is to create a floral support of this type which may be carried or transported while the body is saturated with water and which will retain the cut flowers in position without any external support for the block of water-saturated foam. It is also an object of the invention to create a floral support of the type specified which will retain moisture much longer than known types.

The body of the support is preferably fixed to a rigid base with the result that the foam may be used in the making of bouquets or corsages that can be carried by the person while the stems of the flowers are embedded in the water-saturated foam. In order to prevent the flowers thus carried from tearing or breaking out the fragile foam, the body of the foam is strengthened so that the flower stems will be firmly held and will not break loose during ordinary usage. Foams ordinarily used for moisture-containing floral supports are very fragile and easily crushed, and when saturated with water become soft and mushy and would not be adaptable for making into corsage or bouquet carriers. Preferably the outer surface of the block only may be reinforced for the purpose, but the reinforced foam may extend to the center of the block. The tensile strength of the reinforced area should be sufficient to support the flowers without any other external support.

The body of the support is composed of a synthetic resin in the form of a permanent foam made by blowing various types of organic resins and particularly synthetic resins, such, for example, as phenolic condensation products known as "Bakelite." While it is preferred to employ blown "Bakelite" foam, this does not exclude the use of many other similar resins which are adaptable to the foaming process and which when subjected to heat will cure or set into rigid, irreversible form which is hydrophilic or water absorbent. Urea-formaldehyde foams have been employed.

The type of foam which is used in the improved floral support is that type which is composed of a great multitude of interconnected cells. Phenolic foam is ideal for the purpose and the other foams mentioned have this property in lesser degrees. It is not desired to use any foam which must be crushed to break down individual cell walls in order to have the mass absorb water, nor any foam which with not absorb water, such as styrene foam.

It has been found that the ability of the usable foams to absorb water is greatly enhanced if the foam is treated with a wetting agent either before it is dipped in water or during the immersion. Many types of wetting agents are adaptable, that known as "Igepal CO–530" (alkyl phenoxy polyoxyethylene ethanol) being especially well adapted for the purpose. Polyglycol ether and the various alkyd-aryl sulfonates or artificial soaps may also be used.

Thus, for example, a block of untreated urea-formaldehyde foam 4" x 3" x 2" when immersed in water thirty minutes will absorb only 43 grams, whereas a similar block treated with "Igepal" and without crushing will absorb 263 grams in about two and one-half minutes. A like block of untreated phenolic foam when immersed in water thirty minutes will absorb only 76 grams of water, whereas a similar block treated with "Igepal" will absorb 402 grams in two and one-half minutes. Results with other wetting agents will be comparable.

Foams of the type described are ordinarily very fragile and easily broken or crushed, and when saturated with water are greatly weakened and have less ability to hold flowers in position. While synthetic foams have been a great boon to florists because they provide an ample reservoir of water which will not spill, it is necessary to provide some sort of container to house the mass of damp foam. Hence synthetic foams which are hydrophilic and penetrable by flower stems have not been successful as bases for corsages or bouquets because even a slight jar or blow many cause the flower to break the foam and loosen so as to fall out of the block. If the flower is heavy, it may by its own weight break the foam surrounding its stem. It has been suggested to enclose the block of saturated foam in a waterproof bag, but this does not solve the problem of converting the foam into a mass which will have sufficient inherent strength to support the flowers which are stuck into it.

The improvement which is the subject of this application creates a block of synthetic foam which is capable of receiving and holding flowers without any external support. This is done without lessening the absorptive qualities of the mass of foam. The improved block of foam will support the stems of flowers so efficiently that blocks of the foam may be attached to a holder or bracelet to be carried or worn by the person and they will not be disarranged or lost while being carried. This makes it possible for a florist to make up bouquets or cosages several hours before they are to be used and the pieces will keep fresh much longer.

These results are also accomplished without in any manner interfering with any arrangement of the flowers which the florist may desire. The stems of the flowers can be stuck into the block at any place and no set pattern is required.

In addition the block will retain its moisture content much longer than with blocks of prior designs. Also, that outer surface of the block is not damp so that it can be worn without danger of spotting delicate fabrics with which it may come in contact.

The invention is not necessarily limited to use of the new material as a base for bouquets or corsages for a block of the foam may also be used in vases or dishes as a floral support.

It will be appreciated that while the description has been detailed in order that the invention may be understood and practised, conformity with details is not necessary for a realization of the benefits of the invention. Changes and modifications are permissible, all within the scope of the invention as set out in the appended claims. Also, the invention may be used in several forms as set forth herein.

In the drawings:

Fig. 1 is a perspective view of a holder which is to be carried in the hand, equipped with the new and improved floral support;

Fig. 2 is a view of Fig. 1 shown partly in section;

Fig. 3 is a view showing the block supported in a tray or dish; and

Fig. 4 is an enlarged view of a corner of the block of foam cut away to show the internal structure.

In Figs. 1 and 2, 1 represents a typical foundation or base such as would be carried in the hand. This is representative of a great variety of foundations which may be used. To the carrier is attached a base plate 2, the one which has been selected being a circular disk in which a plurality of apertures 4 are made so that water will reach the block of resin foam. The resin foam is indicated at 5 and may be any of the foams discussed above and preferably one which has been treated with the selected wetting agent. It may be in any shape and size desirable. The block is adhered to the disk by any waterproof cement which does not close up the apertures 4. A centrally located spike 6 may be set in the disk to aid in supporting the block 5.

The exposed surface of the block is covered with a heavy coating or skin 8 which is permanently adhered to the block. This is preferably a paint with a rubber base which will penetrate the outer surface of the block to a sufficient depth to bond itself firmly with the body of the block. To be effective, the layer or skin should be strong enough to support any flower which would be inserted therein. The layer may be applied by dipping the outer surface of the block in a paint bath or by spraying the paint on the block.

In the form of the invention shown in Fig. 3, the block of foam 5a is supported in a dish or tray 7. The outer covering of the block is shown at 8a. It is intended that the dish or tray be made of a material which can be readily expanded so that it is thrown away when the flowers have wilted. Plastic dishes may be used.

While rubber paint is preferred, a linseed oil paint may be used. Only waterproof paints should be employed. The stems of the flowers will readily penetrate the outer skin, and because of the additional support afforded by the outer skin of increased tensile strength, the stems will remain in position even if the body is subjected to jars or vibration. Not only does the outer skin help to support the flowers, but it retards evaporation of the water content of the block.

It is possible to substitute an outer layer of more dense foam for the outer paint covering if the outer layer of foam is sufficiently dense to have the requisite strength. In some aspects of the invention, the whole block may be made of a very dense, strong foam which has been treated as described and which is preferably attached to a base or support.

While a number of synthetic resin foams have been given as suitable for the purpose and all of which are hydrophilic, other water-absorbent, hydrophilic foams may be used.

What is claimed is:

1. A moisture-retaining support for cut flowers comprising a rigid base having passages therethrough for admission of water, and a block of hydrophilic synthetic resin foam treated with a wetting agent fixed to said base.

2. A moisture-retentive support for cut flowers comprising a block of hydrophilic synthetic resin foam and an outer surface united to said block, said outer surface being penetrable by flower stems and having greater tensile strength than the interior of the block, said foam having been treated with a wetting agent.

3. A moisture-retentive support for cut flowers comprising a rigid base, a block of water absorbent synthetic resin foam attached to the base, and an outer covering on the block and united thereto, said outer covering having greater tensile strength than the resin foam constituting the body of the block and penetrable by flower stems, said foam having been treated with a wetting agent.

4. A moisture-retentive support for cut flowers comprising a rigid base, a block of water absorbent synthetic resin foam attached to the base, and an outer coating of waterproof paint over the block, said coating being bonded to the block, penetrable by flower stems and of greater tensile strength than the resin foam constituting the body of the block, said foam having been treated with a wetting agent.

5. A moisture-retentive support for cut flowers comprising a block of hydrophilic synthetic resin foam treated with a wetting agent and reinforced on its outer surface to have sufficient tensile strength to support flowers when the block is saturated with water, and a rigid base to which said block is attached, said base being provided with passages for water to the block.

References Cited in the file of this patent

UNITED STATES PATENTS

| | | |
|---|---|---|
| 2,200,948 | Bufton | May 14, 1940 |
| 2,246,490 | Flues | June 24, 1941 |
| 2,366,377 | Zois | Jan. 2, 1945 |
| 2,416,136 | Arlington | Feb. 18, 1947 |
| 2,473,855 | Braun | June 21, 1949 |
| 2,645,872 | Melander | July 21, 1953 |